United States Patent [19]
Kajita

[11] Patent Number: 5,604,826
[45] Date of Patent: Feb. 18, 1997

[54] IMAGE RECORDING APPARATUS

[75] Inventor: Koji Kajita, Kanagawa-ken, Japan

[73] Assignee: Canon Kabushiki Kaisha, Tokyo, Japan

[21] Appl. No.: 378,937

[22] Filed: Jan. 26, 1995

Related U.S. Application Data

[63] Continuation of Ser. No. 86,768, Jul. 6, 1993, abandoned, which is a continuation of Ser. No. 750,234, Aug. 20, 1991, abandoned, which is a continuation of Ser. No. 420,145, Oct. 19, 1989, abandoned.

[30] Foreign Application Priority Data

Oct. 11, 1988 [JP] Japan ................... 63-256325

[51] Int. Cl.$^6$ ................................. G06K 9/20
[52] U.S. Cl. .............. 382/312; 382/323; 358/497
[58] Field of Search ................... 382/323, 312, 382/321, 313; 358/497, 471, 474, 479, 488

[56] References Cited

U.S. PATENT DOCUMENTS

| | | | |
|---|---|---|---|
| 3,629,828 | 12/1971 | Demer | 382/63 |
| 3,853,403 | 12/1974 | Bentley | 382/65 |
| 4,149,091 | 4/1979 | Crean et al. | 358/497 |
| 4,318,082 | 3/1982 | King | 382/323 |
| 4,639,790 | 1/1987 | Kusaka | 382/323 |
| 4,667,227 | 5/1987 | Ikeda | 358/75 |
| 4,687,944 | 8/1987 | Mitsuka et al. | 358/474 |
| 4,709,147 | 11/1987 | Arai | 250/234 |
| 4,717,965 | 1/1988 | Mashiko et al. | 358/497 |
| 4,750,048 | 6/1988 | Satoh et al. | 382/62 |
| 4,751,376 | 6/1988 | Sugiura et al. | 358/497 |
| 4,763,200 | 8/1988 | Nakatani et al. | 358/497 |
| 4,811,409 | 3/1989 | Cavan | 382/65 |
| 4,817,185 | 3/1989 | Yamaguchi et al. | 382/65 |
| 4,862,512 | 8/1989 | Hidaka et al. | 382/323 |
| 4,864,630 | 9/1989 | Arnold et al. | 382/48 |
| 4,876,612 | 10/1989 | Honma et al. | 358/474 |
| 4,922,087 | 5/1990 | Nakajima et al. | 358/497 |
| 5,068,913 | 11/1991 | Sugiura et al. | 382/61 |
| 5,168,369 | 12/1992 | Sugiura | 382/47 |

*Primary Examiner*—Yon J. Couso
*Attorney, Agent, or Firm*—Fitzpatrick, Cella, Harper & Scinto

[57] ABSTRACT

An image reading apparatus which has a reader for optically reading image data of an object and for converting the image data to an electrical signal, an extractor for extracting a useful part, corresponding to actual image data, from the electrical signal, a controller for changing the useful part to be extracted by the extractor, and a shifting member for shifting the relative position of the reader with respect to the object.

14 Claims, 8 Drawing Sheets

IMAGE RECORDING APPARATUS

This application is a continuation of application Ser. No. 08/086,768 filed Jul. 6, 1993, now abandoned which is a continuation of Ser. No. 07/750,234 filed Aug. 20, 1991, now abandoned which is a continuation of Ser. No. 07/420,145 filed Oct. 11, 1989, now abandoned.

BACKGROUND OF THE INVENTION

1. Field of the Invention

The present invention relates to image reading apparatus which read images optically and change the read image into an electrical signal, and relates especially to image reading apparatus using image sensors almost all of whose pixels are read out, and the output of only a few of whose pixels is discarded.

2. Related Art

A conventional image reading apparatus usually uses a CCD (Charge Coupled Device) sensor. The CCD sensor is designed so that it has a larger number of pixels than are used (i.e., the output of some pixels is discarded; this is sometimes referred to as the sensor imaging size being larger than the actual image size to be read out). To throw that signal away the apparatus controls the electrical timing of reading out the signal of the CCD sensor. It will be appreciated that if the sensor image size is much larger than the actual imaging size, the image sensor is being used wastefully.

On the other hand, if the sensor image size is only slightly larger than the actual imaging size, there are the following problems:

(1) In order to manufacture the image reading apparatus without adjusting the reading out timing of the sensor, the apparatus, especially the optical system used with the sensor, must be assembled with high precision. This raises the cost.

(2) If the image reading apparatus is assembled without high precision, the reading out timing of the apparatus must be adjusted in the field. However, for this adjustment, a high cost metering device is required.

(3) Further, if the reading out timing is changed, the reading out point of an original sheet or image is also changed.

SUMMARY OF THE INVENTION

A purpose of the present invention is to provide image reading apparatus and adjusting method for adjusting such apparatus which overcome the above-mentioned shortcomings.

Another purpose of the present invention is to provide image reading apparatus and an adjusting method for adjusting such apparatus which enable changing the sampling area of a sensor as useful actual image data to compensate for a divergence generated by misarrangement, automatically or manually, and which enable correction of a divergence of reading area of an object, which occurs as a result of changing sampling area of the sensor, by shifting the reading means, including the sensor, relative to the object.

There are, of course, additional features of the invention that will be described in the following detailed description with reference to the accompanying drawings. Those skilled in the art will appreciate that the conception upon which this disclosure is based may readily be utilized as a basis for designing other structures or methods for carrying out the purposes of the invention. It will be understood what the claims are to be regarded as including such other constructions and methods as do not depart from the spirit and scope of the invention.

DETAILED DESCRIPTION OF THE PREFERRED EMBODIMENTS

Figure 1:
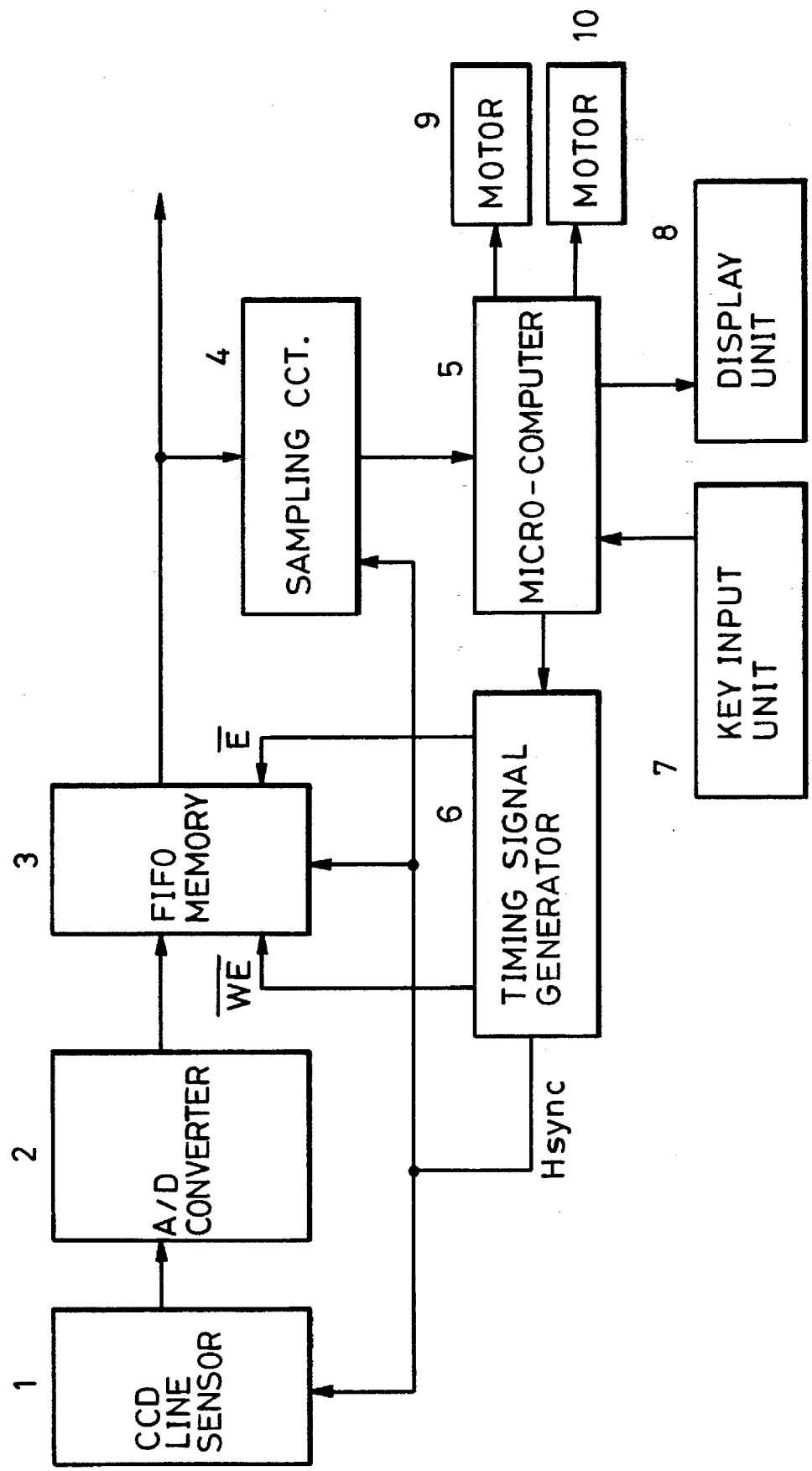
FIG. 1 is a circuit diagram showing a structure of a first embodiment of the present invention.
Figure 2:
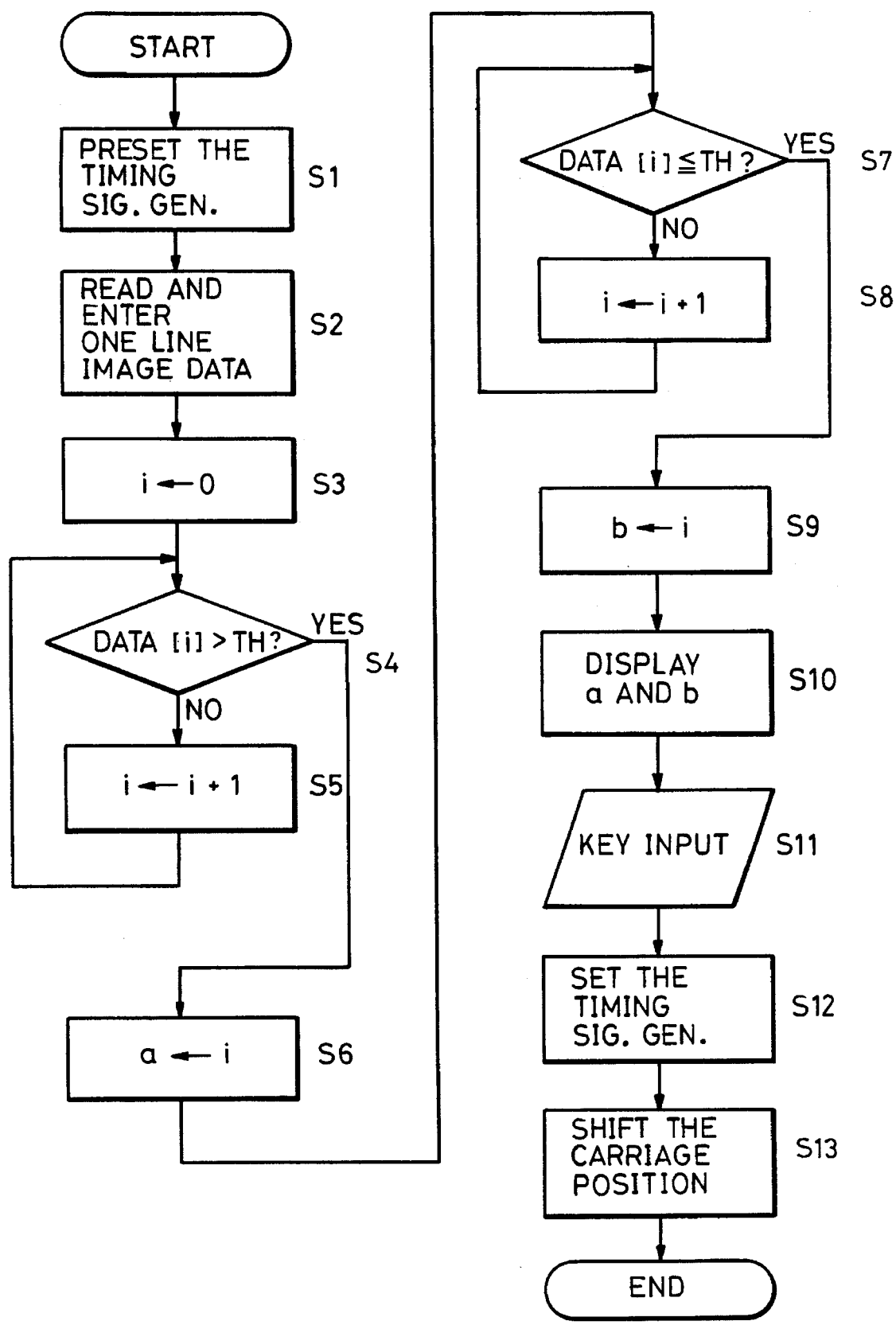
FIG. 2 is a control flowchart of a microcomputer of the first embodiment.
Figure 5:
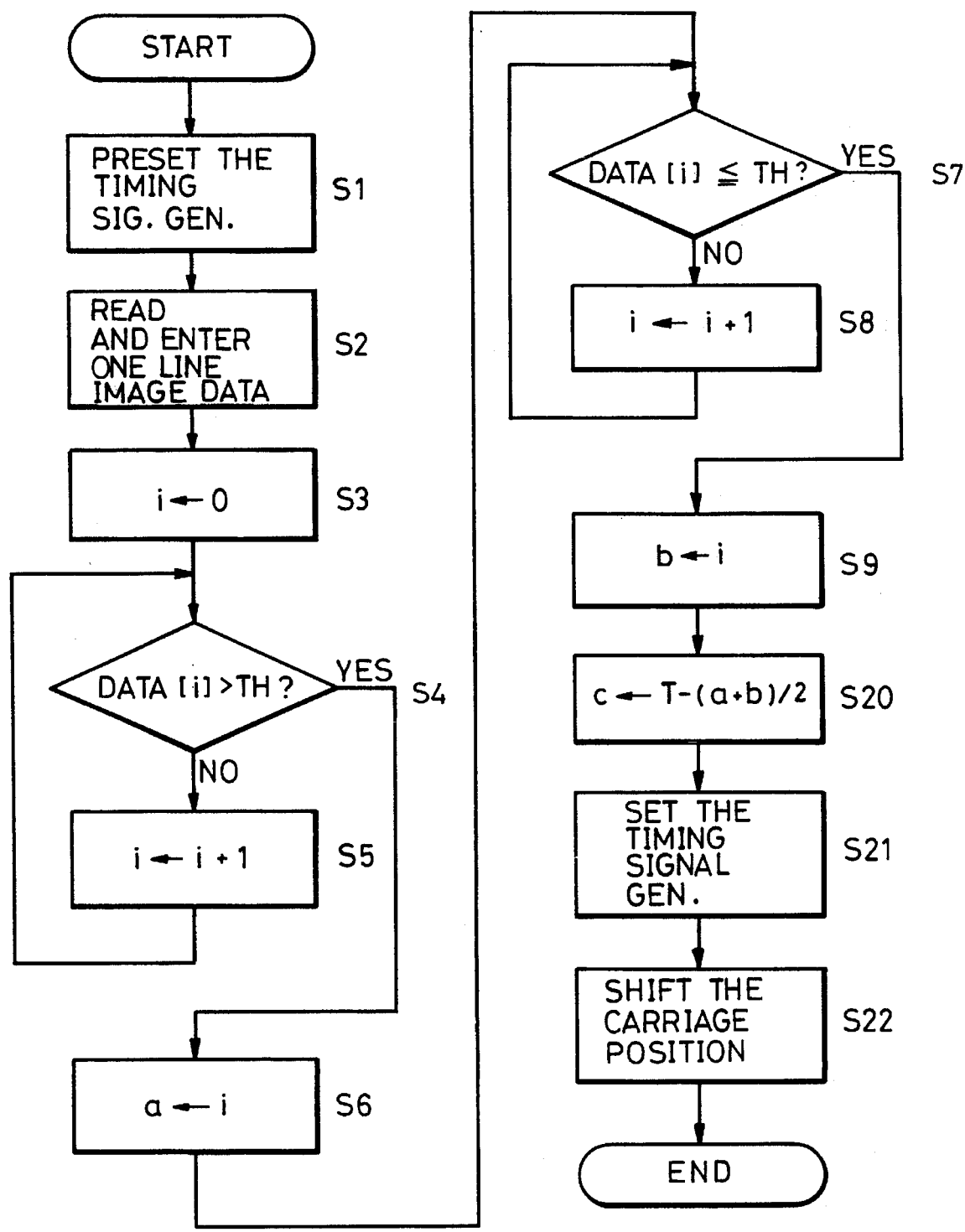
FIG. 5 is a control flow chart of a microcomputer of a third embodiment.

The image reading apparatus shown in FIG. 1 includes a CCD line sensor 1 for detecting line image information and for converting the information to an electric analog signal, an analog to digital (A/D) converter 2 for converting the electric analog signal from the CCD sensor 1 to a digital signal, a first-in-first-out (FIFO) memory 3 for temporarily storing the digital signal, a sampling circuit 4 for sampling and for storing the digital signal from the FIFO memory 3, and a microcomputer 5 for controlling a whole system of the reading apparatus and having a microprocessor, a random access memory (RAM), and a read only memory (ROM) for storing a computer program such as those illustrated in the flow charts of FIG. 2 and FIG. 5, etc.

The image reading apparatus also comprises a timing signal generator 6 for generating a signal H sync which is used for synchronizing video frames, a key input unit 7 for inputting data, a display unit 8 for displaying data, and motors 9 and 10 for moving the carriage position of the CCD sensor 1 respectively in X and Y directions, which are perpendicular to each other.

The sampling circuit 4 may also be structured as a FIFO memory, which makes the circuit 4 simple.

Signals $\overline{WE}$ and $\overline{RE}$ are permission signals applied to the FIFO memory 3 for writing data in and reading data from the memory 3, respectively, both of which signals are generated by the timing signal generator 6.

An image signal read by the CCD 1 is converted to a digital signal by the A/D converter 2, and the digital signal is temporarily stored in the FIFO memory 3, to output only useful actual image data, as explained below. Image data of one line in the memory 3 is also output to the sampling circuit 4. The microcomputer 5 investigates the data in the sampling circuit 4, lets the display unit 8 display information pertaining to the sampled data, and sets signals $\overline{WE}$ and $\overline{RE}$ to the timing generator 6 in response to information input via the key input unit 7 to adjust suitably the area of the actual image data to be output.

These operations of the microcomputer 5 are explained referring to the flow chart of FIG. 2, as follows.

In an adjusting mode, the microcomputer 5 presets the timing signal generator 6 to operate based on a standard timing in step S1. Then the microcomputer 5 causes the sensor 1 to read one line, and causes the sampling circuit 4 store one line of image data in step S2.

The microcomputer 5 may refer to the image data in the sampling circuit 4 and calculate the image data directly. Otherwise, the microcomputer 5 may transfer the image data to its RAM, and then calculate the image data from the RAM.

The data to be calculated by the microcomputer 5 is shown as DATA[n], wherein n denotes the position of a picture element, so that DATA[n] means the image value of the nth picture element.

After the one line of image data is sampled by the sampling circuit 4 or the microcomputer 5, in step S3 the microcomputer resets a counter i to "0". In steps S4 and S5, the counter i is counted up and the value DATA[i] is compared with a threshold level TH, these steps being repeated until the value DATA[i] is over the level TH. Once the value DATA[i] is over the level TH, the number i is stored in an area a of the RAM in step S6.

In steps S7 and S8, the counter i is incremented and the value DATA[i] is compared with the level TH, those steps also being repeated, until the value DATA[i] becomes less than the level TH. Once the level TH is greater than the value DATA[i], the number i is stored in an area b of the RAM in step S9.

In step S10, the microcomputer 5 causes the display unit 8 to display the numbers stored in the areas a and b. Then the operator refers to the numbers stored in the areas a and b, and sets numbers he or she chooses, by means of the key input unit 7, based on the numbers displayed by the display unit 8.

The microcomputer 5 reads the numbers input by the key input unit 7 in step S11, and in step S12 resets the timing generator circuit 6 based on the numbers entered by the operator. Then the microcomputer 5 causes the motors 9 and 10 to move the position of the sensor 1 to make a correction of its position, in step S13.

Referring to FIG. 3, the operation will be explained concretely.

Figure 3A:
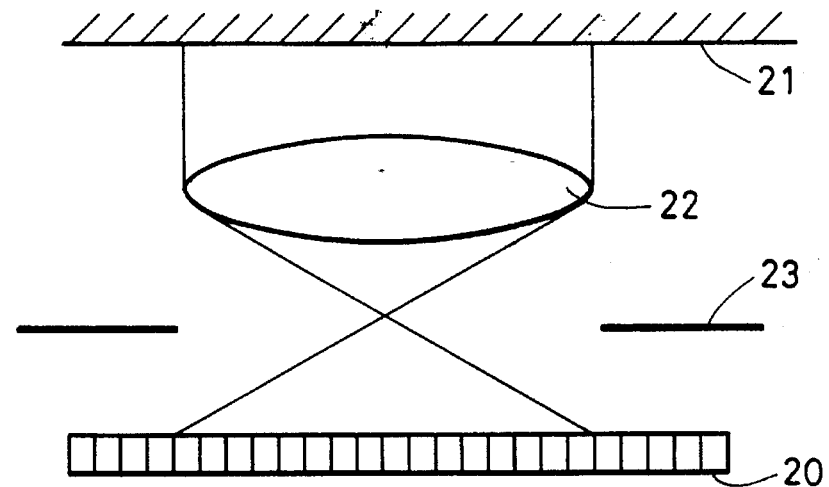
FIG. 3(a) is a simplified drawing showing an optical system used with a CCD, FIGS. 3(b) and (c) are charts showing output data from the CCD before and after adjustment.
Figure 3B:
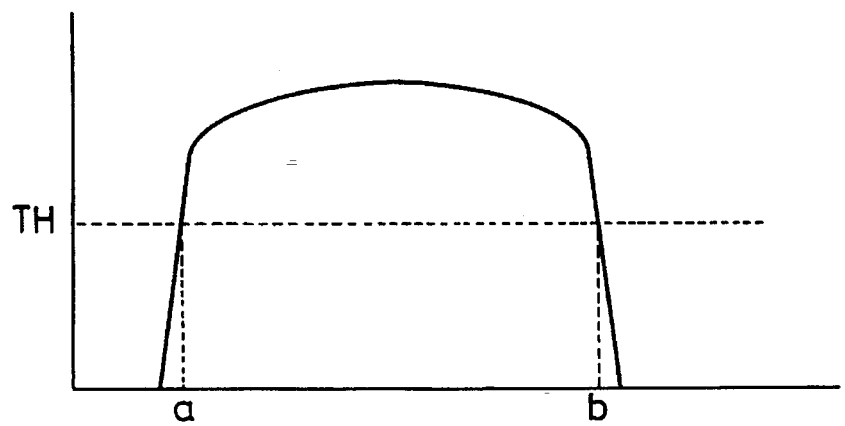

FIG. 3(a) is a drawing of an optical system. The optical system includes a CCD sensor 20 (which corresponds to the CCD sensor 1 in FIG. 1), a white board 21, a lens 22 and an aperture 23. Both ends of the CCD sensor 20 receive no exposure in FIG. 3(a). In this situation, if the standard timing signal is applied to the CCD sensor 20, the CCD sensor 20 outputs one line of image data which represents light reflected from the white board 21, as shown in FIG. 3(b). In FIG. 3(b), picture elements which are not exposed have no output level. Points a and b of this image data shown in FIG. 3(b), at which the data crosses the threshold value TH, are detected as a starting point and an ending point of the image, and are displayed by the display unit 8.

Figure 3C:
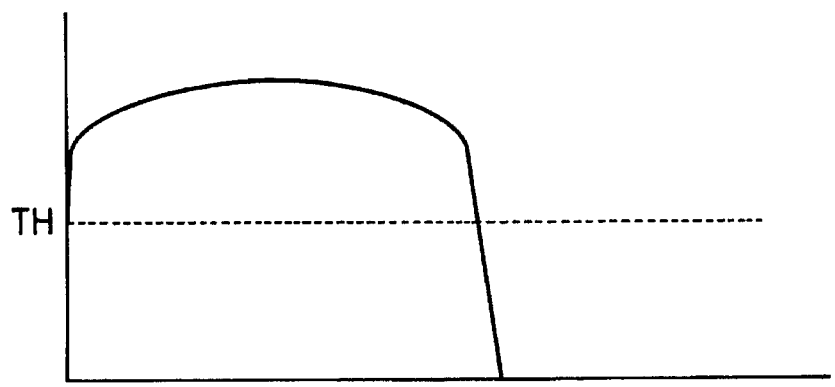

Therefore, if the timing signal generator 6 is adjusted such that the write-enable signal $\overline{WE}$ is generated after the elapse of time corresponding to the number a of picture elements, the image data between the first (i=0) picture element and the (a−1)th picture element is thrown away by the FIFO memory 3, and the useful image data is shifted as shown in FIG. 3(c). Thus, the starting point of the useful image data can be adjusted.

Figure 6:
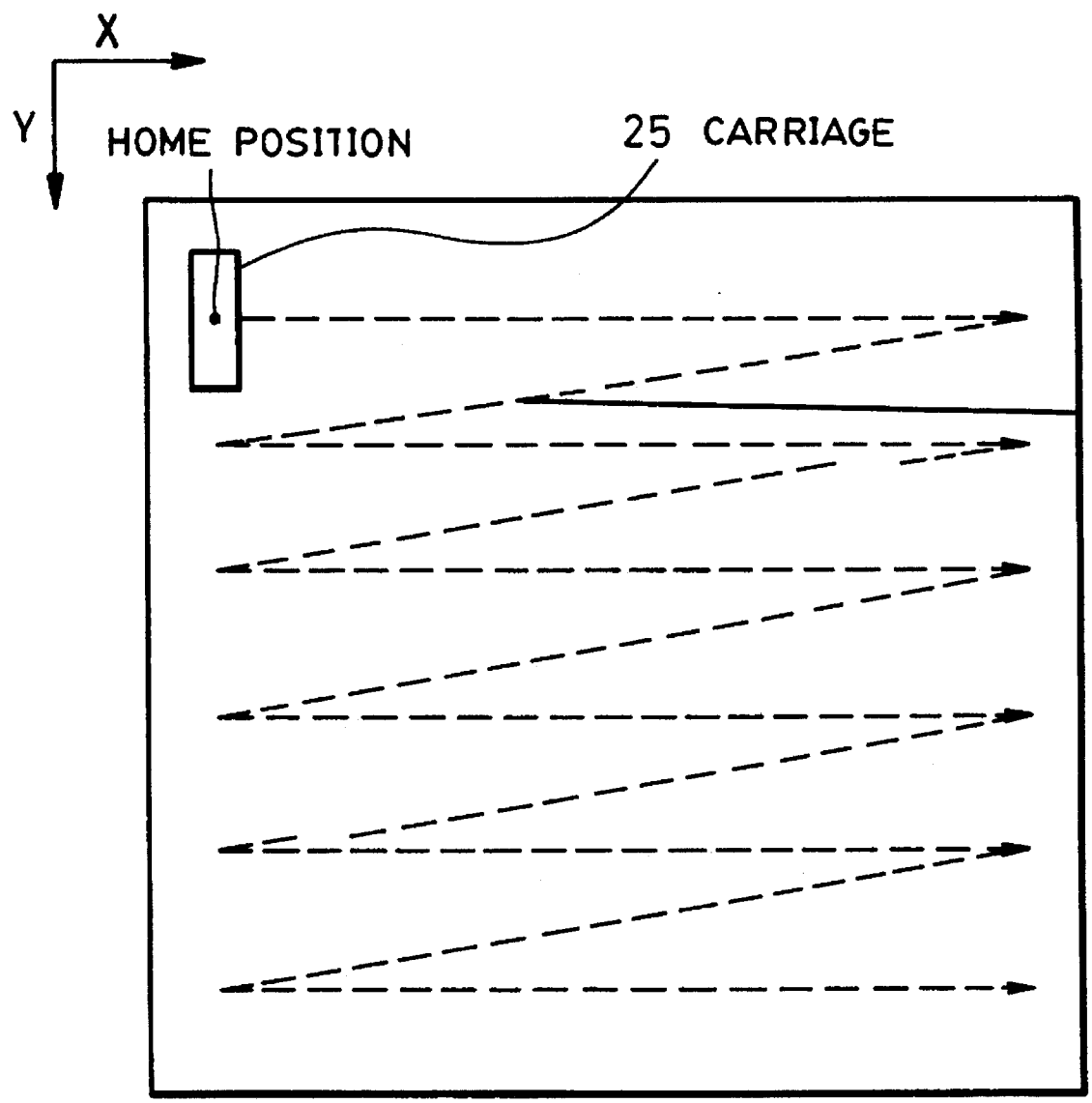
FIG. 6 is a drawing showing a scanning direction of the CCD during its reading operation.

FIG. 6 shows an example of a scanning method of the image reading apparatus to which the present invention is applied, and especially shows a method of moving a carriage 25 carrying the CCD sensor, the aperture and the lens. In this case, the CCD sensor reads a length shorter than the width of image of the original sheet, so that the carriage 25 must move in both directions, perpendicular and parallel to the arrangement of the CCD picture elements (along the path shown by the dotted line).

FIGS. 7(A), 7(B), 7(C) and 7(D) show how to adjust the CCD sensor with respect to the end of the original sheet.

Figure 7:
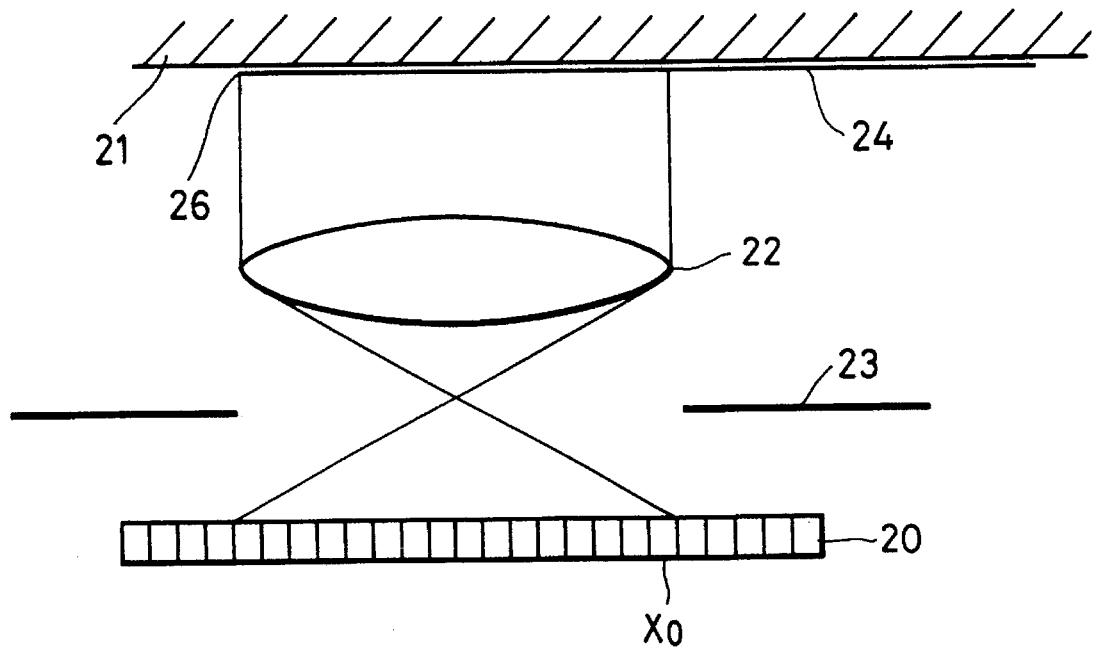
FIGS. 7(a)–7(d) are views for explaining how to adjust the CCD with an end of an original sheet.
Figure 7:
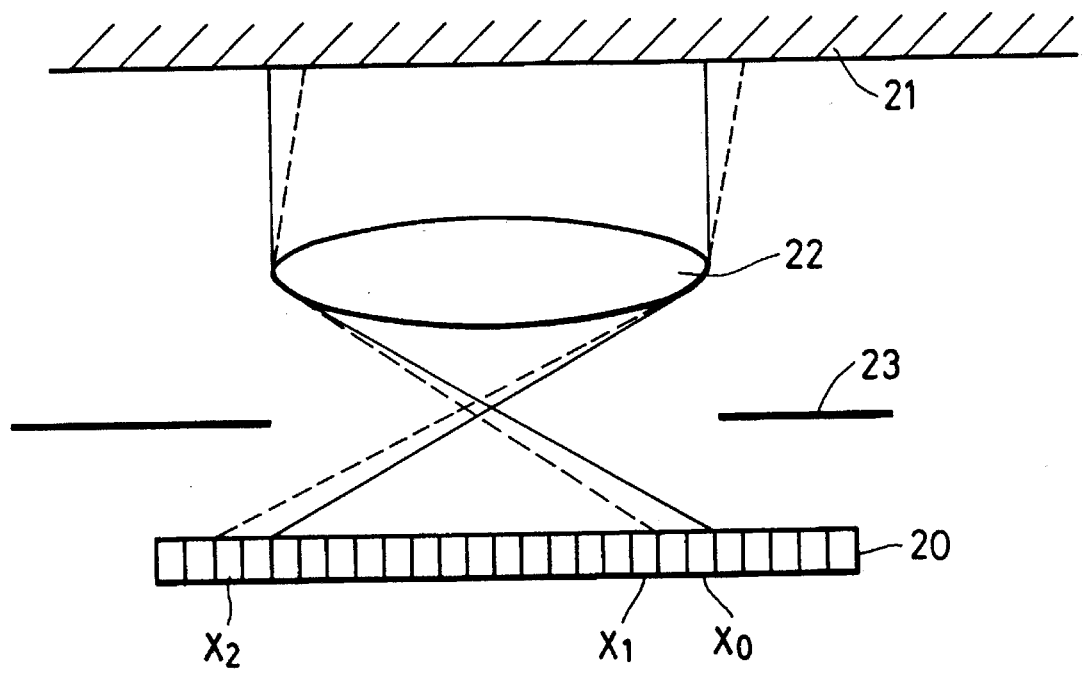
Figure 7C:
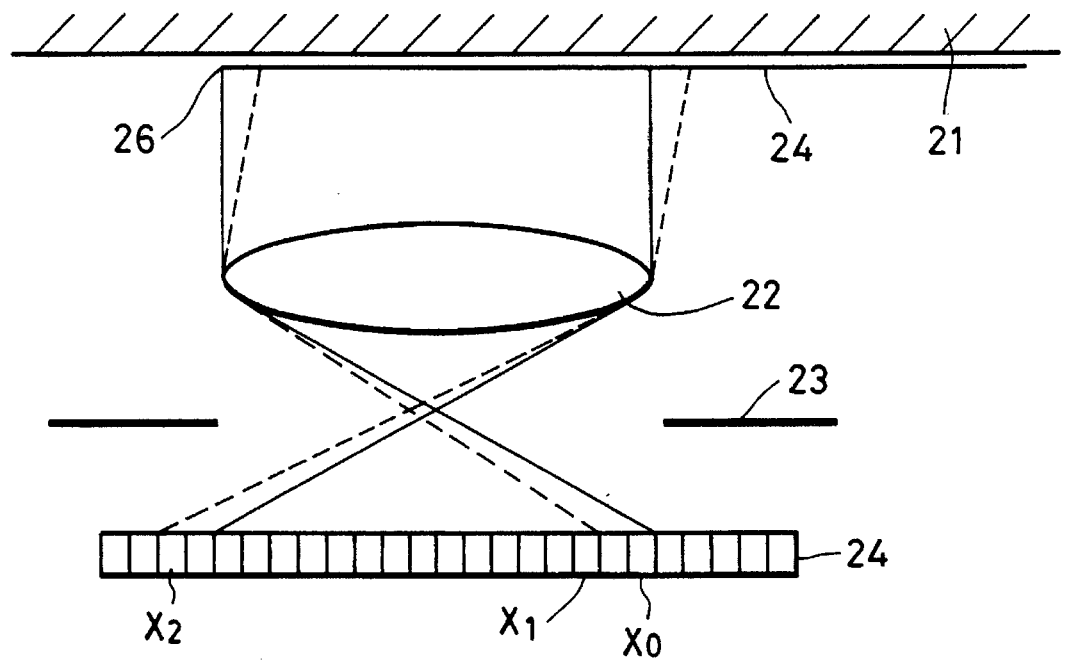

It is assumed that the end 26 of the original sheet 24 is projected on to a picture element $X_0$ of the CCD sensor 20 in an ideal arrangement of the optical system as shown in FIG. 7(A). Actually, however, the optical system is not as in the ideal arrangement, but instead, for example, the optical system is arranged as shown in FIG. 7(B), and incident light from the white reflective board 21 is projected onto the CCD sensor 20 as shown with the dotted lines, and not along the paths shown with solid lines. Picture elements outside of an element $X_1$ are not exposed by the arrangement of the optical system including the aperture 23 as shown in FIG. 7(B). Therefore, if the original sheet 24 is read out by the CCD sensor 20 as is, light reflected from the end 26 of the sheet 24 is not led to the CCD sensor 20, and the information of the end 26 of the sheet 24 is not read out but is thrown away.

Figure 7D:
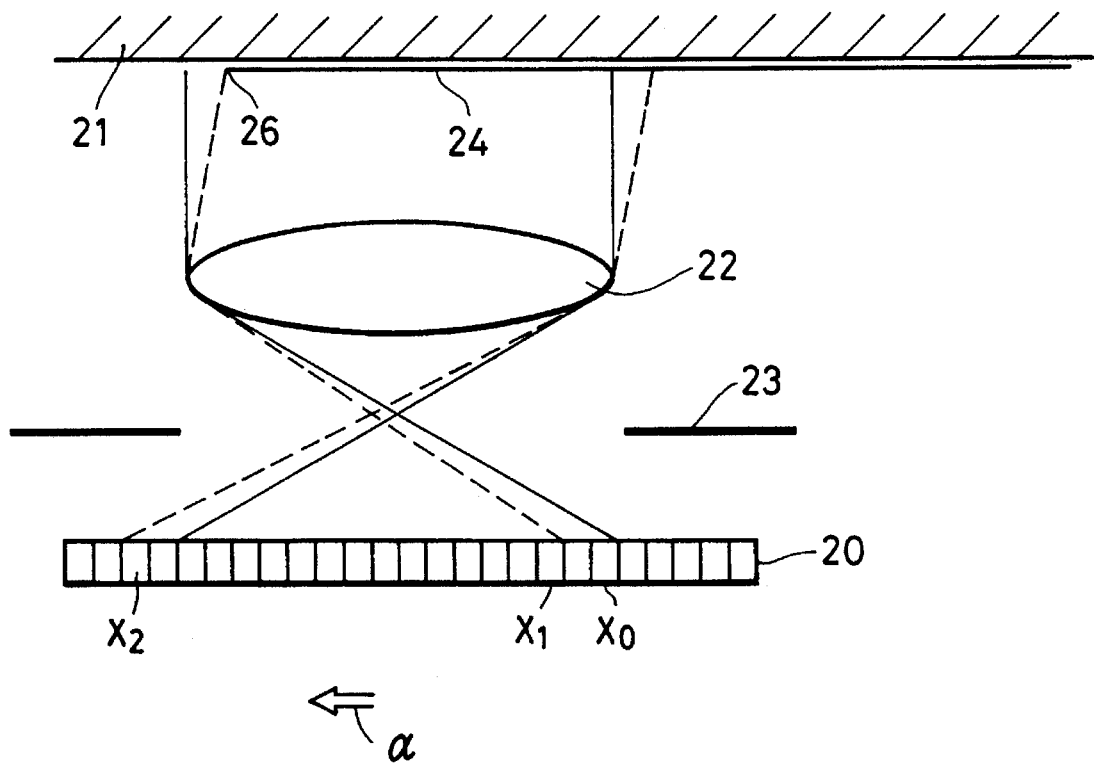

In order to avoid such loss of the original information, the carriage 25 supporting the lens 22, the aperture 23 and the CCD sensor 20 is shifted by two picture elements in a direction of an arrow ∝ in this embodiment so that the light reflected from the end 26 of the sheet 24 is able to be projected onto the element $X_1$ of the CCD sensor 20, as shown in FIG. 7(D).

In other words, in step S12, the timing signal generator 6 is controlled such that picture elements between X2 and X1 of the sensor 20 are read out, and then in step S13, the motor 9 or 10 is driven to shift the optical system including the CCD sensor 20, the aperture 23 and the lens 22 in the direction of picture elements arrangement (Y in FIG. 6) such that the end 26 of the original sheet 24 corresponds to the element $X_1$.

As described above, if the timing signal generator 6 is thus corrected or controlled to make a correction of the reading-out position of the CCD sensor 20, the spatial position of the optical system is shifted to compensate for this correction of the reading-out position of the sensor 20. This operation (steps S1 through S13) is carried out during searching a home position of the carriage 25 prior to actual scanning of the original sheet.

Second Embodiment

Figure 4:
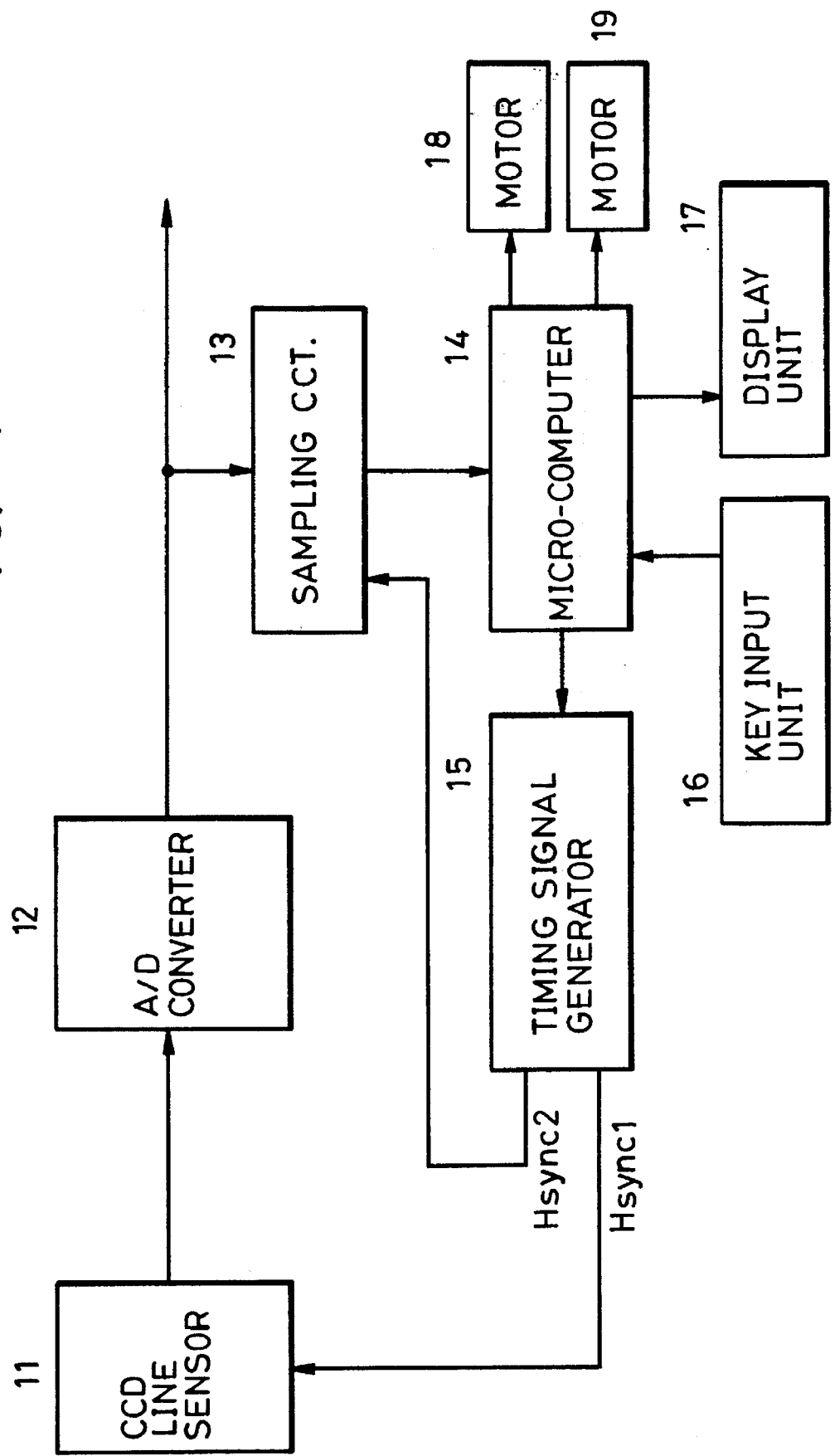
FIG. 4 is a circuit diagram showing a structure of a second embodiment.

A second embodiment is shown in FIG. 4, which has a different structure than the first embodiment shown in FIG. 1.

The second embodiment of the image reading apparatus includes a CCD line sensor 11, an A/D converter 12, a sampling circuit 13, a microcomputer 14, a timing signal generator 15, a key input unit 16, a display unit 17, and motors 18 and 19 which drive a carriage supporting an optical system including the CCD sensor 11 in X and Y directions, respectively.

The CCD sensor 11 converts an original image to an electric signal, and the electric signal of the image data is converted to a digital signal by the A/D converter 12. The digital signal representing one line of image data is input to the sampling circuit 13.

The microcomputer 14 causes the display unit 17 to display information for adjustment based on the data sampled by the sampling circuit 13, and to adjust the timing of signals by the timing signal generator 15 based on data input via the key input unit 16. The timing signals Hsync 1 and Hsync 2 are adjusted in this manner. In this embodiment, Hsync 1 is a synchronizing signal for the CCD sensor 11, and Hsync 2 is a synchronizing signal for the other circuits of this apparatus. Therefore, if the synchronizing signal Hsync 1 of the CCD sensor 11 is shifted relative to the synchronizing signal Hsync 2 of the other circuitry, the reading-out position of the CCD sensor 11 can be shifted.

Also, as in the first embodiment, the microcomputer 14 causes the motor 19 to shift the carriage supporting the optical system having the CCD sensor, an aperture and a lens, in order to compensate for this correction of the reading-out position of the sensor 11.

The operation of the microcomputer 14 is as in the first embodiment, so that reference may be made to the flow chart of FIG. 2.

Third Embodiment

FIG. 5 is a flow chart of the operation of the microcomputer 5 or 14, to carry out automatic adjustment of the reading-out position of the CCD sensor. The structures of the reading apparatus of FIG. 1 or of FIG. 4 can be applied to this third embodiment.

In the flow chart of FIG. 5, steps S1 through S9 are the same as in FIG. 2 to obtain the starting and ending picture elements a and b.

In step S20, the microcomputer calculates the center picture element of the range from a to b with the expression $(a+b)/2$, and calculates the divergence between the center picture element $(a+b)/2$ and a desired center picture element T with the expression $T-(a+b)/2$. The value of the expression $T-(a+b)/2$ is stored in an area c of the RAM. Then, the microcomputer adjusts the timing signal generator to shift the timing of the reading-out operation by a time corresponding to the value stored in the area c, in step S21.

As in the first and second embodiments, the carriage supporting the CCD sensor, the aperture and the lens is shifted to compensate for the correction of the reading-out position of the sensor, in step S22.

Thus, the reading-out position can be adjusted such that the center picture element can be at the desired position. In this embodiment, the information for adjustment is not displayed, but such display may be carried out for confirmation of the adjustment.

Although particular embodiments of the present invention are herein described in detail for the purpose of explanation, various modifications thereof, after study of this specification, will be apparent to those skilled in the art to which the invention pertains.

For example, while in these embodiments a line image sensor is used, the present invention can be applied to an area sensor wherein picture elements are arranged in X and Y directions two-dimensionally. In such a case, both changing the timing of reading out or the above-described shifting operation, or both, can, if desired, be carried out in both directions X and Y.

Further, in these embodiments, while a carriage supporting a sensor and other reading members is moved for scanning an object, the object can instead (or in addition) be moved for scanning. Also, a standard position of the original for registration can be moved for adjustment, instead of moving the sensor and other members.

As described above, by controlling the timing of the timing signals the reading-out position of the sensor can easily be adjusted. By shifting the carriage of the sensor and other optical members, the sensor can be adjusted to read all the information of the original.

Further, the useful image area of the sensor can be effectively used without complicated adjustment and without wasting a large part of the area of the sensor.

What is claimed is:

1. An image reading apparatus, comprising:

a line sensor, having a plurality of picture elements, for photoelectrically reading an image of an object and for generating image data, said line sensor reading a reading line extending in a direction of arrangement of the plurality of picture elements divisionally by performing reading a plurality of times, said line sensor being movably mounted to permit movement in the direction of arrangement of the plurality of picture elements;

optical means for guiding image light from the object to said line sensor, said optical means having a lens and an aperture which are fixedly arranged to said line sensor;

discriminating means for discriminating picture elements of said line sensor which are substantially exposed to the image light through said optical means;

motor means for physically moving said line sensor in the direction of arrangement of the plurality of picture elements of said line sensor; and adjusting means for automatically driving said motor means so as to read the image of the object by using the picture elements of said line sensor discriminated by said discriminating means.

2. An image reading apparatus according to claim 1, wherein said adjusting means adjusts the position of said line sensor in response to a discrimination result of said discriminating means.

3. An image reading apparatus according to claim 1, wherein said discriminating means discriminates the picture elements exposed to the image light, based on the image data generated by said line sensor.

4. An image reading apparatus according to claim 1, further comprising display means for displaying a discrimination result of said discriminating means.

5. An image reading apparatus according to claim 1, further comprising extracting means for extracting image data corresponding to the picture elements discriminated by said discriminating means.

6. An image reading apparatus according to claim 1, further comprising:

moving means for moving said line sensor two-dimensionally in main and sub-scanning directions so that said line sensor reads the image of the object by dividing the object, in the main scanning direction, into a plurality of areas.

7. An image reading apparatus according to claim 1, wherein said line sensor is shorter than a maximum reading width in the main scanning direction of an original.

8. A method on an image reading apparatus having a line sensor including a plurality of picture elements, for photoelectrically reading an image of an object and for generating image data, the line sensor being movably mounted to permit movement in a direction of arrangement of the plurality of picture elements, and a motor means for physically moving the line sensor in the direction of arrangement of the plurality of picture elements, said method comprising the steps of:

reading a reading line extending in the direction of arrangement of the plurality of picture elements divisionally by performing reading a plurality of times;

optically guiding image light from the object to the line sensor, using a lens and an aperture which are fixedly arranged to the line sensor;

discriminating picture elements of the line sensor which are substantially exposed to the image light at said optically guiding step; and automatically driving the motor means so as to read the image of the object by using the picture elements of the line sensor discriminated at said discriminating step.

9. A method according to claim 8, wherein said automatically driving step adjusts the position of the line sensor in response to a discrimination result of said discriminating step.

10. A method according to claim 8, wherein said discriminating step discriminates the picture elements exposed to the image light, based on the image data generated by the line sensor.

11. A method according to claim 8, further comprising the step of displaying a discrimination result of said discriminating means.

12. A method according to claim 8, further comprising the step of extracting image data corresponding to the picture elements discriminated at said discriminating step.

13. A method according to claim 8, further comprising the step of moving the line sensor two-dimensionally in main and sub-scanning directions so that the line sensor reads the image of the object by dividing the object, in the main scanning direction, into a plurality of areas.

14. A method according to claim 8, wherein the line sensor is shorter than a maximum reading width in the main scanning direction of an original.

* * * * *

UNITED STATES PATENT AND TRADEMARK OFFICE
CERTIFICATE OF CORRECTION

PATENT NO. : 5,604,826
DATED : February 18, 1997
INVENTOR(S) : Koji Kajita

It is certified that error appears in the above-indentified patent and that said Letters Patent is hereby corrected as shown below:

Title page, item [56], References Cited, should read-- 4,742,559 5/1988    Fujiwara et al.    382/58--.

Item [63], Related U.S. Application Data, should read--Oct. 11, 1989--.

Signed and Sealed this

Eighteenth Day of November 1997

Attest:

BRUCE LEHMAN

*Attesting Officer*              *Commissioner of Patents and Trademarks*